United States Patent Office.

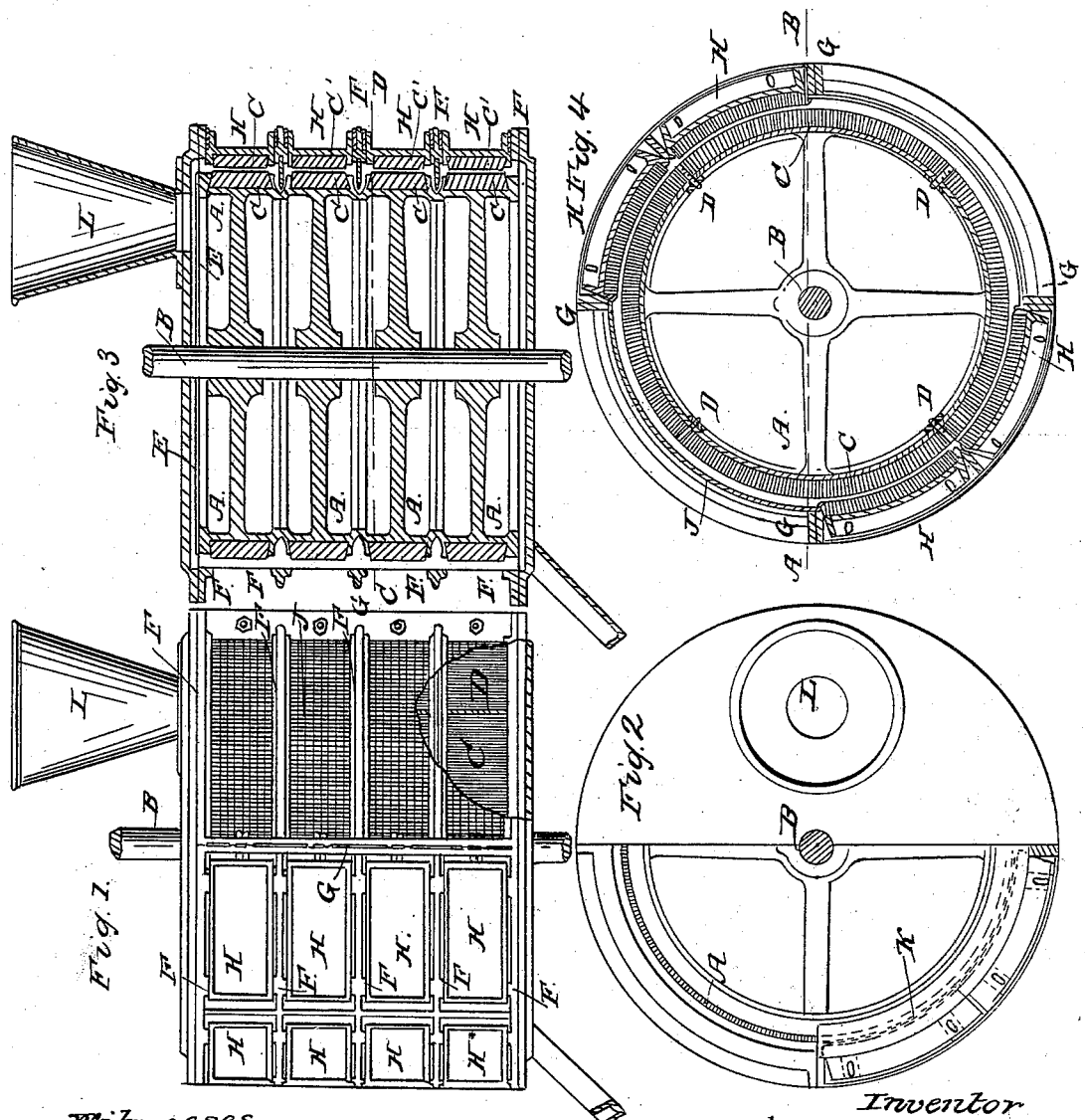

WILLIAM WALKER GIBSON, OF EDINBURGH, NORTH BRITAIN.

Letters Patent No. 79,970, dated July 14, 1868.

---

IMPROVED APPARATUS FOR DECORTICATING AND CLEANING CEREALS.

---

*The Schedule referred to in these Letters Patent and making part of the same.*

---

TO WHOM IT MAY CONCERN:

Be it known that I, WILLIAM WALKER GIBSON, of Edinburgh, in the county of Mid Lothian, North Britain, have invented certain new and useful Improvements in Decorticating and Cleaning Cereals, and in the machinery or apparatus employed therefor; and I hereby declare the following to be a full, clear, and exact description of the same, reference being had to the accompanying drawings.

This invention, which essentially relates to certain novel apparatus to be used for decorticating cereals, by which improved results are obtained, consists of a revolving drum, which may be made of wood, metal, or other suitable material. On the surface of this drum, blades or strips of glass, porcelain, common clay, or other pottery-ware are fixed. The drum is situated within a chamber or receptacle, in which the grain to be decorticated is placed, the sides of the chamber being composed wholly or partly of wire gauze. The grain to be cleaned and decorticated is fed into the apparatus from a hopper at the top, and as it passes between the surface of the revolving drum and wire-gauze casing, the triturating or rubbing action to which it is thus submitted, causes it to be decorticated and cleaned, and the husk and cleanings are blown out through the meshes of the wire-gauze covering.

In place of forming the casing entirely of wire gauze, it may be partly formed of chambers containing glass, porcelain-clay, or pottery-ware strips, the strips being fixed in a manner similar to that by which they are held in the drum. The decorticated and cleaned grain passes out through a spout at the bottom of the case.

Description of Drawings.

Figure 1 is an elevation.
Figure 2, a plan, shown partly in section.
Figure 3, a vertical section, and
Figure 4 a horizontal section.

The machine consists of a drum, formed of four cast-iron sheaves, marked A, figs. 3 and 4, keyed on a vertical shaft, B. A flange is formed round the edges of their peripheries, and the space between these flanges is filled alternately with strips of glass and cement, marked C, figs. 3 and 4. To facilitate the filling in of the glass, a narrow slot is made in several places of one of the flanges of the sheave, which is closed with a slip of malleable iron, figs. 1 and 4, and fastened with a nut on the inner side of the periphery. The end of the drum is covered with a plate of sheet iron, E, fig. 3. The drum is enclosed in a casing, formed of a ribbed framing, F, figs. 1 and 3, cast in quadrants, and bolted together by bolts passing through the flanges G, figs. 1 and 4. The framing of the two quadrants is constructed so as to receive the frames marked H, figs. 1, 3, and 4, which are bolted through the rings of the framing. The frames are filled with glass and cement in the same manner as the periphery of the drum, care being taken that the slips of glass project a little beyond the cement. On the inside of the other two quadrants of the framing, iron-wire-gauze frames are fastened, as shown, and marked J in figs. 1, 3, and 4. Between each of the frames in the casing, horizontal malleable-iron rings are placed, marked K, figs. 2 and 3. The casing is closed at the top and bottom by circular cast-iron ends. On the top, a hopper, L, is situated.

The action of the machine is as follows: The cereals to be decorticated are introduced into the hopper L, figs. 1, 2, and 3, and fall upon the revolving plate E, fig. 3, which covers the top of the drum. The grain being thrown outwards by centrifugal force, falls over the edge of the plate, and the husk is rubbed off as it descends between the glass surfaces of the revolving drum and the casing. As the grain passes down, it is guided from sheave to sheave by the malleable-iron rings K, figs. 2 and 3, the husks are blown out through the meshes or openings of the wire gauze, and the decorticated grain passes through a spout at the bottom end of the casing, figs. 1 and 3.

Claim.

I claim the employment of a revolving drum for decorticating cereals, upon the surface or periphery of which strips or blades of glass, porcelain, or like material are fixed and arranged, substantially in the manner shown and set forth.

In testimony whereof, I have signed my name to this specification in the presence of two subscribing witnesses.

WM. W. GIBSON.

Witnesses:
GEO. BROWN, *Toophall, Bonnington.*
INGLIS CRAWFORD, 10 *Union Str't, Leith.*